United States Patent [19]

Pez et al.

[11] Patent Number: 4,761,164
[45] Date of Patent: Aug. 2, 1988

[54] METHOD FOR GAS SEPARATION

[75] Inventors: Guido P. Pez, Allentown, Pa.; Richard T. Carlin, Buffalo, N.Y.; Daniel V. Laciak, Fogelsville; James C. Sorensen, Allentown, both of Pa.

[73] Assignee: Air Products and Chemicals, Inc., Allentown, Pa.

[21] Appl. No.: 934,583

[22] Filed: Nov. 25, 1986

Related U.S. Application Data

[63] Continuation-in-part of Ser. No. 707,299, Mar. 1, 1985, abandoned.

[51] Int. Cl.[4] ............................................. B01D 53/22
[52] U.S. Cl. ................................................ 55/16; 55/68; 55/72; 423/226; 423/237; 423/246
[58] Field of Search .......................... 55/16, 68, 158; 423/210.5, 219, 235, 641–643, DIG. 12, 226, 246, 247

[56] References Cited

U.S. PATENT DOCUMENTS

| | | | |
|---|---|---|---|
| 2,983,767 | 5/1961 | Fleck et al. | 260/674 |
| 3,155,467 | 11/1964 | Yamamota et al. | 55/16 |
| 3,335,545 | 8/1967 | Robb et al. | 55/16 |
| 3,396,510 | 8/1968 | Ward, III et al. | 55/16 |
| 3,400,054 | 9/1968 | Ruka et al. | 204/1 |
| 3,432,363 | 3/1969 | Gillis | 136/153 |
| 3,447,286 | 6/1969 | Dounoucos | 55/16 |
| 3,503,186 | 3/1970 | Wood, III et al. | 55/16 |
| 3,527,618 | 9/1970 | Bushnell | 136/86 |
| 3,676,220 | 7/1972 | Ward, III | 136/86 |
| 3,718,733 | 2/1973 | Gehri | 423/246 X |
| 3,727,058 | 4/1943 | Schrey | 250/83.3 |
| 3,819,806 | 6/1974 | Ward, III et al. | 423/220 |
| 3,847,672 | 11/1974 | Trocciola et al. | 55/16 X |
| 3,993,542 | 11/1976 | Blum et al. | 55/16 X |
| 4,014,665 | 3/1977 | Steigelmann | 55/16 |
| 4,015,955 | 4/1977 | Steigelmann et al. | 55/16 |
| 4,117,079 | 9/1978 | Bellows | 55/16 X |
| 4,119,408 | 10/1978 | Matson | 422/169 |
| 4,132,766 | 1/1979 | Erickson | 423/219 X |
| 4,147,754 | 4/1979 | Ward, III | 423/224 |
| 4,174,374 | 11/1979 | Matson | 423/232 |
| 4,277,452 | 7/1981 | Kanehori et al. | 423/246 |
| 4,317,865 | 3/1982 | Trocciola et al. | 429/41 |
| 4,318,714 | 3/1982 | Kimura et al. | 55/16 |
| 4,340,578 | 7/1982 | Erickson | 423/219 X |
| 4,396,572 | 8/1983 | Batigne et al. | 264/510 |
| 4,496,373 | 1/1985 | Behr et al. | 55/16 |
| 4,526,775 | 7/1985 | Cassano | 423/219 X |
| 4,529,577 | 7/1985 | Chen et al. | 423/210.5 X |
| 4,617,029 | 10/1986 | Pez et al. | 55/16 |
| 4,627,859 | 12/1986 | Zupancic et al. | 55/158 |

FOREIGN PATENT DOCUMENTS

| | | | |
|---|---|---|---|
| 31195 | 8/1974 | Japan | 55/158 |
| 94626 | 7/1980 | Japan | 55/16 |
| 138935 | 8/1982 | Japan | 55/158 |
| 150508 | 8/1984 | Japan | 55/158 |
| 51524 | 3/1985 | Japan | 55/158 |
| 137416 | 7/1985 | Japan | 55/158 |
| 604826 | 9/1978 | Switzerland | 55/16 |
| 2082156A | 3/1982 | United Kingdom . | |

OTHER PUBLICATIONS

Journal of Membrane Science, 12(1982), 239–259, J. Douglas Way et al., "Liquid Membrane Transport: A Survey".
Division of Chemical Engineering, The University of Michigan, Ann Arbor, pp. 194–215, Biochemica et Biophyica Acta, "Nonequilibrium Facilitated Diffusion of Oxygen through Membranes of Aqueous Cobaltodihistine".

Primary Examiner—Robert Spitzer
Attorney, Agent, or Firm—Mark L. Rodgers; William F. Marsh; James C. Simmons

[57] ABSTRACT

The present invention is a process for separating one or more components of a gas mixture. The process comprises passing the gas mixture over a membrane, which is selectively permeable to the component being separated, due to one or more reversible reactions between the component desired to be separated and a layer of active molten material immobilized in a suitable support material and/or encapsulated in a non-porous gas permeable polymer material.

20 Claims, 1 Drawing Sheet

METHOD FOR GAS SEPARATION

CROSS REFERENCE TO PARENT APPLICATION

This is a continuation-in-part of U.S. patent application Ser. No. 707,299, filed Mar. 1, 1985, and now abandoned, the subject matter of which is hereby incorporated by reference.

TECHNICAL FIELD

This invention relates to an improved method for separation of a gas from a mixture of gases and to improved membranes for the separation process.

BACKGROUND ART

Numerous approaches to the separation of a gas from a mixture of gases by differential permeation have been investigated. Robb et al., in U.S. Pat. No. 3,335,545, have proposed use of a liquid, entrapped in a porous or permeable support, to separate mixtures of gases. The use of a so-called "quasi-liquid film," for example, diethylene glycol, in a support has permitted separation of carbon dioxide from nitrogen, hydrogen or oxygen, the selectivity being somewhat higher than would be predicted on the basis of the molecular weights of the gases as the sole factor influencing separation. Ward III, has proposed, in U.S. Pat. No. 3,503,186, a similar procedure for separating sulfur dioxide from other gases.

The use of facilitated transport liquid membranes has been reviewed by Way et al., *J. Membrane Science*, vol. 12 (1982), pages 239–259. Another typical disclosure of gas separation using a facilitated transport immobilized membrane is that of Bassett et al., *Biochimica et Biophysica Acta*, vol. 211 (1970), pages 194–215. Facilitated transport of gases through liquid membranes is also recited, for example, in the following U.S. Pat. Nos.:

3,396,510—Ward, III, et al.
3,676,220—Ward, III
3,819,806—Ward, III, et al.
4,014,665—Steigelmann
4,015,955—Steigelmann et al.
4,119,408—Matson
4,147,754—Ward, III
4,174,374—Matson Ward, III, et al. '510 recite using an immobilized liquid film as a permeable membrane, wherein the liquid film contains at least one soluble, non-volatile, dissolved carrier species, which is reversibly chemically reactive with a selected component of a gaseous mixture.

Kimura et al. (U.S. Pat. No. 4,318,714) have recited using an ion-exchange membrane to accomplish facilitated separation of a gas from a mixture of gases.

Yamamoto et al. (U.S. Pat. No. 3,155,467) have disclosed separation and purification of hydrogen, using a palladium alloy as a permeable wall structure.

Solid and molten salt electrolytes have been disclosed, in the fuel cell or electrochemical arts, in the following representative patents:

U.S. Pat. No. 3,400,054—Ruka et al.
U.S. Pat. No. 3,432,363—Gillis
U.S. Pat. No. 3,527,618—Bushnell
U.S. Pat. No. 3,727,058—Schrey
U.S. Pat. No. 4,317,865—Trocciola et al.
U.K. Pat. No. 2,082,156—Yoshisato et al.

A limiting feature in many of these disclosures is that a gas should not completely permeate the electrolyte or electrode, since complete penetration could short circuit the device.

Batigne et al., U.S. Pat. No. 4,396,572, recite using a porous ceramic barrier having a plurality of superimposed layers of pastes of varying composition, to separate uranium hexafluoride isotopes by ultrafiltration.

It is apparent that presently available membranes for separation of gases by diffusion, permeation or ultrafiltration are for the most part relatively unselective or complex in structure.

It is therefore an object of this invention to provide methods and articles for the separation of gases from mixtures, which are much more highly selective and have higher fluxes of permeating gas than presently available methods and to provide membranes which are simple to construct and to use.

Fleck, U.S. Pat. No. 2,983,767, teaches separating a fluid mixture of organic compounds by passing the mixture over a diffusion barrier containing a specified Werner metal complex in the form of a crystalline solid which forms a clathrate inclusion compound with one or more components of the fluid.

DISCLOSURE OF INVENTION

In one aspect, this invention relates to a process for separating at least one gas from a mixture of gases, comprising passing the gas mixture over a membrane selectively permeable to the gas being separated as a result of one or more reversible reactions between the gas being separated and an active molten salt immobilized in a suitable support material and/or encapsulated in a non-porous gas permeable polymer material.

In another aspect, this invention relates to a membrane for gas separation process, comprising an active molten salt immobilized in a suitable support material and/or encapsulated in a non-porous gas permeable polymer material. Any molten salt may be used which is capable of undergoing a reversible reaction with at least one component in the feed gas mixture. Examples of reversible reactions of various molten salts include: oxidation-reduction reactions, formation of a coordination complex, an acid-base reaction, formation of an organic chemical compound, and the like. One example would be nitrate molten salt encapsulated in a non-porous polymer material, wherein said nitrate molten salt material is capable of undergoing reversible oxidation-reduction reactions to separate oxygen from a gaseous mixture such as air.

In still another aspect, this invention relates to a process for separating a gas from at least one other gas in a mixture by the steps of: introducing the mixture into a module having at least a feed gas inlet and a permeate gas outlet and containing a membrane as described above; passing the mixture through the feed inlet and into contact with the inlet side of the membrane; removing from the inlet side of the membrane a gas stream rejected by the membrane and removing from the permeate gas outlet the gas passing by reaction through the membrane.

"Salt," as used in the specification and claims, means a substance which is comprised of cations and anions and which is characterized by overall electrical neutrality. The cations and anions may be inorganic, organic or a combination of both. It will be understood that salts have a wide range of melting points, including room temperature, and that, for the purposes of this invention, the melting point of the salt used as active material is the minimum temperature at which the membranes of this invention can be used for separation of a gas from a mixture of gases. Molten salts are sometimes referred to as "ionic liquids", see: "Ionic Liquids", D. Inman and D. G. Lovering, Eds, Plenum Press, N.Y. 1981.

"Immobilized," as used in the specification and claims, refers to molten active material, captured within the pores or interstices of the ceramic or other support, as well as any material in the form of a thin film of salt melt on the surface of the support. Although the molten salt need not necessarily fill the entire void volume of the porous support, it is believed that a thin continuous layer of molten salt in or on the support is necessary for the successful operation of the membranes.

"Reversible reaction," as used in the specification and claims essentially means a chemical reaction which can go forward to the right or backwards to the left, depending upon the relative concentrations of reactants and products at any time. One type of reversible reaction within the meaning of the invention is formation of a coordination complex. A coordination complex or coordination compound consists of a central atom or ion, surrounded by a set of other atoms, ions or small molecules. The atoms, ions or molecules surrounding the central atom are conventionally called ligands. The resulting entity is generally a complex and, specifically, in the practice of this invention is a complex ion. The gas being separated from the mixture will accordingly be a ligand in this complex ion.

Typical examples of coordination compounds include entities such as $SiF_6^=$, $PF_6^-$, $Cr(CO)_6$, $Cr(NH_3)_6^{+3}$, $Co(NH_3)_6^{+3}$, $CoCl_4^=$ and $Zn(NH_3)_2^{++}$. The complexes useful in accordance with this invention will be those formed by an ion of a salt, whether a cation or an anion.

In a representative case, the separation of ammonia from nitrogen in contact with a membrane comprising molten zinc chloride, it is proposed that the zinc chloride in this ammonia-rich environment reacts reversibly to form a zinc ammoniate coordination compound, $Zn(NH_3)^{++}$. The condition of a crosssection of the membrane is thought to be that depicted below:

The zinc ammoniate ions thus formed at the feed side will diffuse toward the permeate side, where there is a lower concentration of such ions. At the interface, where there is a much lower partial pressure of ammonia, the zinc ammoniate ions will reversibly dissociate back into zinc ions and free ammonia, which is removed as the permeate stream.

The steady state condition of the membrane is shown in the diagram below, wherein the zinc ions thus formed at the permeate side diffuse back to a region of lower concentration at the feed side, thus completing the overall cycle, which amounts to net transport of ammonia through the membrane. This net transport of ammonia through the membrane arises from the reversible reactivity of ammonia with zinc ions and the mobility of the zinc ions and zinc ammoniate ions in the molten salt. Chloride acts, in this example, to provide electrical neutrality.

The other feed gas, nitrogen, does not react with the molten salt. Since there is no mechanism by which nitrogen can be transported actively through the membrane, it remains largely on the feed side and an excellent overall separation of ammonia from nitrogen is thus achieved.

Although the foregoing gives a proposed theoretical explanation of the mechanism by which the process of the present invention operates, it will be understood that the inventors do not wish to be bound by such explanation and rely on the appended claims to define the invention.

In practice, preferred separations employing coordination complexes are those wherein:

(a) fused molten lithium nitrate is used for the separation of ammonia from nitrogen or hydrogen or a mixture thereof, preferably from nitrogen, by the reversible formation of a lithium ammoniate in the melt;

(b) ammonia is separated from hydrogen or nitrogen using molten zinc chloride as the active material in the membrane and the complex formed in the melt is a mono-or diammoniate; and (c) water is separated from oxygen, nitrogen or air by formation of one or more dissolved hydrate complexes in a melt of lithium and sodium nitrates.

Another type of reversible reaction, appropriate for the practice of this invention is an acid-base reaction. This type of reaction includes those of Arrhenius acids, Lowry-Bronsted acids and Lewis acids and bases.

A representative embodiment of a separation involving an acid-base reaction is the separation of carbon dioxide from a mixture of gases, in the presence of $H_2O$ vapor with a molten tetraalkylammonium carboxylate salt. Alkyl can be the same or different alkyl of 1-24 carbon atoms and is preferably of 1-10 carbon atoms. The carboxylate can have any anion radical which will give a salt of the melting point range, desired for operation of the membrane. Tetrahexylammonium benzoate (THAB) is particularly preferred.

These tetraalkylammonium carboxylates can also be used for the separation of hydrogen sulfide from other gases.

A further reversible reaction, utilized in the practice of this invention, is formation of an organic chemical compound, which is capable of spontaneous formation and dissociation at the temperature of operation of the membrane. For example, tetraalkylammonium salts of amino acids can react reversibly with carbon dioxide to form carbamates. This reaction can be used for the separation of carbon dioxide from other gases. Alkyl can be the same or different alkyl of 1-24 carbon atoms. A preferred embodiment is that in which the amino acid is glycine or sarcosine and the alkyl is of 1-10 carbon atoms. In the case of sarcosine, the relevant reaction is:

It is proposed that separation of ammonia, based on formation of coordination complexes with zinc chloride, may be governed according to chemical properties set forth by Krasnov et al., "Tables and Diagrams of Thermodymanic Properties of Zinc Chloride Ammoniates in Vapor and liquid Phases," *Moskov. Vsesovuznvy Toplo-Tekhnicheskiv Institut. Izvestiva, Moscow*, no. 11 (1935), pages 44–49; Starokadomskaya, "Saturation Pressure of Ammonia During the Thermal Decomposition of the Diammonium Salt of Zinc Chloride," *Zhurnal Prikladnoy Khimii*, vol. 9 (1935 or 1936), pages 599–602; Zubakhina, "Investigation of Complexing in the $ZnCl_2$-$NH_3$ System," *Trudy Nauchno-Issledovatek'skogo Instituta Osnovnoi Khimii*, vol. 19 (1969), pages 105–110.

Solubility behavior of ammonia in melts of alkali nitrate and perchlorate is discussed by Allulli, *J. Phys. Chem.*, vol 73 (1969), pages 1084–1087.

Properties of chloroaluminates, which might be germane to the use of molten cuprous chloride coordination complexes, e.g., $(C_2H_5)_3NH^+CuCl_2^-$ or $(CH_2H_5)_3PH^+CuCl_2^-$ as active materials for the coordination of carbon monoxide, are reported by Walker, "Solid and Liquid Phases Containing $CuAlCl_4$," Symposium on Advances in Separation Technology, presented before the Division of Petroleum Chemistry, Inc., Seattle Meeting, March, 1983, pages 746–755; Kendall et al., "A Study of the Factors Influencing Compound Formation and Solubility in Fused Salt Mixtures," *J. Am. Chem. Soc.*, vol. 45 (1923), pages 963, ff; Hussey, "Room Temperature Molten Salt Systems, Mamantov et al., ed., *Advances in Molten Salt Chemistry 5*, Elsevier, New York (1983), pages 185–219; Hussey et al., "The Electrochemistry of Copper in a Room Temperature Acidic Chloroaluminate Melt," *J. Electrochem. Soc.: Solid-State Science and Technology*, vol. 126 (1979), pages 1029–1034; and Hussey, Mamantov ed., *Advances in Molten Salt Chemistry 5*, pages 219–223.

The reaction of silver (I) compounds having hard counterions, e.g. $AgBF_4$, $AgClO_4$, with olefins is recited by Cotton et al., "Advanced Inorganic Chemistry A Comprehensive Test," John Wiley & Sons, New York (1980), pages 971–972. It is expected that the reported complex formation of monovalent silver compounds with olefins could be exploited for separating olefins from a gas mixture containing them.

It will be understood that the reversible reactions, appropriate for use in the practice of this invention, are not limited to those set forth above. The specific reversible reaction will depend upon the specific molten salt material and the gas material to be separated.

Figures 1, 2, 3, 4:
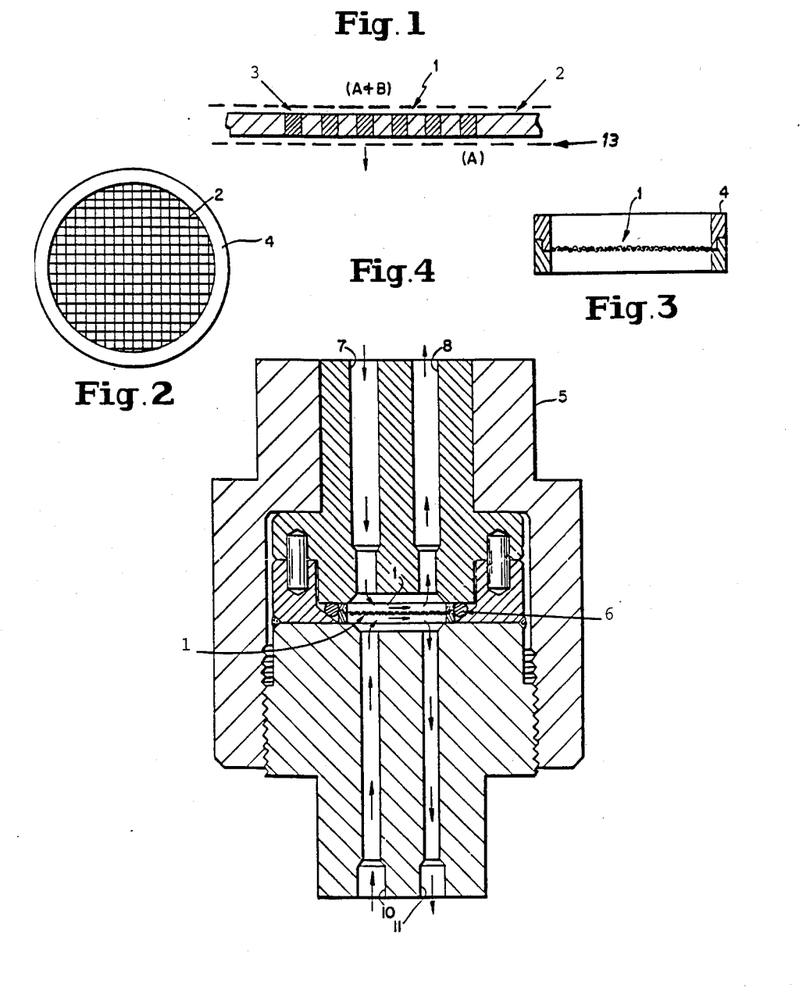
In FIG. 1 is shown a side view of a membrane useful for the practice of the present invention.
In FIGS. 2, 3 and 4 are shown a test apparatus for demonstrating the principles of this invention, including a membrane, membrane holder and test cell.

The membranes of the present invention are represented macroscopically in FIG. 1, for the separation of a permeable gas (A) from a mixture of gases A and B. The porous solid is a rigid, or slightly flexible, inert material, selected from metallic, polymeric or ceramic substrates. The support material is filled or coated with at least a continuous layer of the selected molten salt, or mixture thereof. The feed gas passes over the feed side of the membrane, as shown by the mixture A+B on the upper side of FIG. 1. The reactive member of the gas mixture will undergo a series of reversible reactions with ions in the molten salt, as discussed above. Eventually, at steady state conditions, the reactive gas (A) permeates the membrane. In an experimental context, the reactive or permeate gas (A) is removed from the system by an inert sweep gas and a sample of the sweep gas stream is transferred to a gas chromatograph for analysis. In large scale utilization of the invention, it may be preferred to exhaust permeate gas from the system with a compressor and transfer relatively pure permeate gas to a process requiring it or to containers.

It is proposed that the gas pressure, required to displace liquid that is immobilized by capillary forces from the pores of a porous wetted membrane, conforms to the equation (Porter, "Handbook, of Separation Techniques for Chemical Engineers," Schweitzer, ed., McGraw-Hill (1979), Appendix A, page 2-89):

$$P=(4\gamma\cos\theta)/d$$

wherein $\gamma$ is the surface tension of the gas-liquid interface, $\theta$ is the contact angle between the liquid and the pore wall and d is the pore size.

In qualitative terms, the salt or mixture of salts selected for the membrane will be fluid at the temperature of use, but the melt will not have an excessive rate of flow or tendency to dry out or migrate from the inert support. The salt will be essentially non-volatile under conditions of use.

Although membranes, comprising a monomolecular layer of active molten salt in the inert support will function in accordance with this invention, it is preferrred to use membranes, having a continuous film of molten active salt immobolized in and layered on the support, or a combination thereof. Membranes meeting this criteria will have very low permeability to a non-reactive gas at 760 torr at the temperature of use, as measured against the background content of inert, non-reactive sweep gas on the permeate side of the membrane. In a preferred case, the permeability of nitrogen as the inert gas is selected as a standard and is below 20 Barrer under these conditions.

The support is selected from ceramic, metallic and organic polymeric materials, stable at the temperature of use, which are either rigid or slightly flexible and which do not react with the active molten salt or with the gas mixture being treated. A practical lower limit for the thickness of selfsupporting membranes is below 0.01 centimeters, but some thinner materials may lack the rigidity required. However, ultrafine porous ceramic films, less than 20 micrometers in thickness are known, Leemaars et al., *J. Materials Science*, vol. 19 (1984), pages 1077–1088. It will be understood that the support can be coated or adhered to another material, usually of greater porosity, which will provide the structural rigidity required.

For example, a "composite" or "asymmetric" membrane, as described in Schweitzer, "Handbook of Separation Techniques for Chemical Engineers," McGraw Hill (1979), pages 2-19 to 2-26, contemplated for use in the practice of this invention would have a thin finely porous layer, containing the active molten salt, supported further on a macroporous support comprising polymeric, ceramic or metallic material.

It is further preferred that the support have a pore size of 0.003-100 micrometers. It will be appreciated that large effective membrane areas can be attained by using a plurality of smaller membranes, connected by a manifold or other connecting means, or that a large membrane can be made mechanically strong by the use of supporting means, well kown to those skilled in the art.

The membrane may be contained within a module in the configuration of hollow fibers, a spiral winding or a series of flat plates. A description of hollow fiber and spirally-wound membrane configurations is given in Schweitzer, ibid., pages 2-61 to 2-65 and 2-21, respectively.

In any separation process, carried out under the principles of this invention, the maximum achievable flux of permeate gas per cross-sectional area of membrane is equal to the effective diffusion coefficient of the carrier (active molten salt), multiplied by the concentration gradient of carrier (driving force) between the two interfaces of the membrane. Thus, $$Flux = Dx(\Delta C/\Delta l)$$

$$(cm^3 \cdot cm^{-2} \cdot sec^{-1}) = (cm^2 \cdot sec^{-1}) \times (cm^3 \cdot cm^3/cm)$$

In general, the flux through a membrane may be expressed as the product of a standard permeability times the cross-sectional area of the membrane, times ($\Delta P/\Delta l$), wherein P is the pressure across the membrane and $\Delta l$ is the thickness of the membrane.

As in any facilitated transport system, the actual flux will also depend on the kinetics of the reversible reactions of the permeating gas with the molten salt.

Permeability (Po) is expressed in Barrer units, that is, $$1 \text{ Barrer} = (cm^3 \cdot cm \times 10^{-10})/(sec \cdot cm^2 \cdot cmHg)$$

When polymeric membranes are used to support a melt and it is desired to express the gas flux through the membrane in a manner which reflects only the separation performance of the melt, a correction will be made for the porosity and tortuosity of the membrane, so that:

$$Flux = Po \cdot A \cdot (\Delta P/\Delta l) \text{ (porosity/tortuosity)}$$

Selectivity (S) for a mixture of gases, A and B, in which A is the permeate gas, is expressed by the ratio of permeabilities:

$$S = Po_A/Po_B$$

Very high selectivities are observed, using typical membranes of this invention. For example, selectivities of 80-145 were measured for separation of ammonia from nitrogen, using a molten salt membrane of lithium chloride. The same separation, utilizing molten zinc chloride as the active molten salt in the membrane, gave selectivities above 1000:1.

Similarly, the separation of carbon dioxide from nitrogen, using molten tetraalkylammonium benzoate or sarcosinate salts in the membranes, exceeded a selectivity of 10. In the case of the tetralkylammonium benzoate membrane, it was surprisingly round that the presence of water in the gas stream improved the separation, rather than affecting it deleteriously.

The selectivity for separation of water vapor from nitrogen, using a molten lithium nitrate/sodium nitrate membrane, was about 200:1.

It is therefore apparent that the membranes of the present invention give impressive selectivities, compared to selectivities of known membranes, typical examples of which are set forth in Table 1 below.

TABLE 1

| Membrane | Standard Permeabilities (Po) in Barrer Units, and Permeability Ratios of Polymer Membranes to $NH_3$, $H_2$ and $N_2$ | | | | |
|---|---|---|---|---|---|
| | Po($NH_3$) | Po($H_2$) | Po($N_2$) | Po($NH_3$)/Po($H_2$) | T(°C.) |
| Ultrathin polyetherimide[a] | 48.4 | 25.8 | 0.361 | 1.9 | 23° |
| Ethyl cellulose[b] | 705 | 87 | 8.4 (at 30° C.) | 8.1 | 25° |
| Cellulose nitrate[b] | 57.1 | 2.0 (at 20° C.) | 0.12 | 29 | 25° |
| Silicone rubber on polysulfone multi-component membrane[c] | 210[f] | 55[f] | — | 3.8 | RT |
| Polysulfone[c] | 53.0 | 13.0 | | 4.1 | RT |
| Polyethylene[d] | 29 | 7 | 0.9 | 4.1 | 25° |
| Plasticized poly-(trifluorochloroethylene)[d] | 5 | 4 | 0.3 | 1.3 | 25° |
| Cellulose acetate[e] | 6550[f] | 246[f] | 3.2[f] | 26 | — |
| Poly-4,4'-diphenylene-sulfoneterephthalamide[g] | 1200 | | | 180 | |

[a]Browall, U.S. Pat. No. 4,156,597.
[b]Polymer Handbook, 2nd edition, J. Brandrup et al., Eds., John Wiley and Sons, NY, (1975), page III-239.
[c]Henis et al., U.S. Pat. No. 4,230,463.
[d]Brubaker et al., Ind. Eng. Chem., vol. 46, (1954), page 733.
[e]Separex ® sales literature, 1982; relative permeability data given in Table 1 was calculated from Relative permeation rates of Separex ® cellulose acetate, membranes given as, $NH_3$ (400) $H_2$ (15) $N_2$ (0.20), scf per hour per sq ft at 7.03 Kg km$^2$, temp. not specified. Source Battelle, "Business Opportunities in Membrane Technology", Final Report to Multiclient Sponsors June 22, 1983.
[f]units of p/l = $(10^6 \cdot cm^3)/(cm^2 \cdot sec \cdot cmHg)$
[g]Semenova, U.S.S.R. Patent 1063774-A (1983)

EXPERIMENTAL

In one particular embodiment of this invention, the membrane comprises an inert ceramic support at least 0.01 cm in thickness, and which has a pore size of 0.003-100 micrometers, is filled with a continuous film of molten active material and has a permeability to nitrogen below 20 Barrers at 760 torr at the temperature of use.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, temperatures are set forth uncorrected in degrees Celsius. Unless otherwise indicated, all parts and percentages are by weight.

For experiments at high temperatures, a membrane FIG. 1 comprising a thin film (about 0.2 mm) of a molten salt 3 supported in a porous metlallic or ceramic material 2, was used. In a typical case, the membrane support was a circular piece of #304 stainless steel woven wire mesh (about 0.02 cm in thickness, pore size from 4-13 micrometers, Pall Corp., Cortland, N.Y.), supported rigidly between two Inconel 600 rings about 10 cm in inner diameter. The mesh was loaded with a salt by melting the dry salt into its pores, until at least enough salt was used to provide a visibly continuous molten film on one surface of the wire mesh. The thus-coated mesh and support assembly was sealed into a sample cell. In FIGS. 2 and 3 are shown a top view and a side view, respectively, of holder assembly 4 for a wire mesh membrane support. In FIG. 4 is shown the sample cell 5, including the gold O-ring 6 with which the support assembly is sealed into the sample cell.

The sample cell or module 5, as shown in FIG. 4, was provided with means for introducing feed gas through feed inlet 7, on the feed side of the membrane 1, and for removal of a gas stream rejected by the membrane through reject outlet 8; with permeate sweep gas inlet 10 on the opposite side of the membrane, for passing sweep gas in contact with the membrane 1 and permeate outlet means 11 for conveying permeate gases and carrier gases to an analyzer means. The apparatus was housed in a thermostated, tubular, high-temperature heating mantle and could operate at temperatures up to about 550° C. The experimental assembly also included a gas manifold and was further provided with electronic mass flow controllers to permit precise blending of feed gas mixtures. A gas chromatograph was used for analysis of the permeate gases in the sweep stream.

A typical lower-temperature membrane was prepared by placing several drops of a low-melting salt (tetrahexylammonium benzoate, Eastman Kodak Co.) on a circular piece of 3501 Celgard ™ (Celanese Corp.) porous polymer. The polymer was 27 micrometers thick and had pore dimensions of 0.4×0.04 micrometers. The salt was smeared over the support with a microscope slide, which was used to remove excess salt from the membrane. The filled/coated membrane was loaded into a standard test cell, similar to above, but thermostatted in a bath of ethylene glycol.

EXAMPLE 1

Separation of Ammonia from Nitrogen using a Lithium Nitrate Immobilized Molten Salt Membrane Stainless steel woven wire mesh (#304, about 0.02 cm thick, 4-13 micrometers pore size, area about 0.8 cm$^2$) was coated with fused lithium nitrate to provide a visibly continuous molten film on one surface of the wire mesh, which was mounted into the high-temperature testing apparatus. The sample was heated to a furnace temperature of 279° C., using a feed flow of 30 cm$^3$/min for feed gas and a sweep flow on the permeate side of the membrane of 30 cm$^3$/min of helium, both at about 1 atmosphere pressure and 25° C. The total pressure in the cell during the experiments was about 760 torr. The concentration of gases in the permeate stream was determined by gas chromatography, using a 305 cm molecular sieve column for nitrogen and a 183 cm Chromosorb column for ammonia, both operated isothermally at 60° C. After the system, had stabilized at the operating temperature, there was no leak of nitrogen across the membrane, as indicated by very low nitrogen permeability.

The utility of the membrane in separating ammonia from nitrogen was tested in three one-day runs. During each run, the concentration of ammonia in the ammonia/nitrogen feed was varied from 0.100%. The concentrations of ammonia and nitrogen in the permeate were monitored by gas chromatography.

Results for specific ammonia nitrogen mixtures, representing an average of the three one-days runs were:

| Gas Mix(torr) | | Permeability(Po) of NH$_3$ | Selectivity(S) for NH$_3$ |
|---|---|---|---|
| NH$_3$ | N$_2$ | Barrer × 10$^{-3}$ | S = PoNH$_3$/PoN$_2$ |
| 76 | 684 | 9.9 | 245 |
| 190 | 570 | 7.4 | 129 |
| 380 | 380 | 7.1 | 80 |
| 760 | 0 | 6.5 | — |

These results show that good separation of ammonia and nitrogen was accomplished, using the immobilized lithium nitrate membrane. It is also apparent that permeability is a function of the partial pressures at the feed interface of the membrane.

EXAMPLE 2

(a) Separation of Ammonia from Nitrogen using a Zinc Chloride Immobilized Molten Salt Membrane The membrane was prepared by melting zinc chloride into the pores of stainless steel mesh (about 0.02 cm thick, area 0.8 cm$^2$). The membrane was placed in the high temperature cell and checked for continuity by measuring permeability of pure nitrogen at 310° C.

The membrane was used for separation of ammonia from nitrogen over a 21-day period of continuous operation. Gas flow on both the feed and permeate side was 20 cm$^3$/min at about 1 atm and 25° C. Permeabilities were calculated as the means of 10-15 measurements of ammonia and nitrogen fluxes over a two-hour period, after the system had reached equilibrium under a given set of conditions. Results were:

| Gas Mix(torr) | | Permeability (Po), NH$_3$ (Barrer × 10$^{-4}$) | | |
|---|---|---|---|---|
| NH$_3$ | N$_2$ | 250° C. | 300° C. | 350° C. |
| 80 | 720 | 10 | 13 | 14 |
| 160 | 640 | 6.9 | 7.9 | 15 |
| 320 | 480 | 2.8 | 4.4 | 4.6 |
| 480 | 320 | — | 4.3 | — |
| 640 | 160 | 2.1 | 3.3 | — |
| 800 | 0 | 2.1 | 2.9 | 3.2 |

Nitrogen flux through the zinc chloride membrane was very low, close to the background level of nitrogen in the sweep stream. Therefore, the selectivity could not be determined quantitatively, but was estimated to be at least 1000 :1.

(b) Separation of Ammonia from Hydrogen

Experiments were done as in Example 2(a), using as the feed stream a mixture of ammonia and hydrogen.

Argon was used as the permeate sweep gas to facilitate detection of hydrogen by the gas chromatograph.

At 311° C., using feed of pure hydrogen (800 torr), the standard hydrogen permeability was calculated to be 9 Barrer. Under the same conditions, using pure ammonia as feed, the permeability of ammonia was $2.9 \times 10^4$ Barrers. Therefore, the ammonia/hydrogen selectivity was about 3200:1.

EXAMPLE 3

Separation of Ammonia from Nitrogen using Zinc Chloride Immboilized Molten Salt Supported in a Porous Ceramic Membrane A circular sample of woven zirconium dioxide cloth (about 0.038 cm in thickness, 87% porosity, type ZYW-15, Zircar Ceramics, Florida, N.Y.) was soaked in molten zinc chloride. The thus-impregnated membrane was sandwiched between two annular Inconel rings (outer diameter about 1 cm, inner diameter about 0.6 cm). The resulting assembly was sealed into the high-temperature test cell using gold O-rings.

Permeability measurements were made as in Example 2 at gas pressures of about 1 atm, feed rates of ammonia/nitrogen or helium sweep gas of 20 cm$^3$/min at about 1 atm and 25° C. and an internal membrane temperature of 311° C.

Owing to uncertainties about the thickness of the membrane, permeabilities in Barrer, as indicateed below, are uncertain. Membrane performance, defined as Po/Δl (cm$^3$/cm$^2$·sec·cmHg) was obtained by dividing standard permeability by the assumed thickness of the membrane (l=0.038 cm). The nitrogen flux was accordingly very low, compared to the background level of nitrogen in the helium sweep. The estimated PoNH$_3$/PoN$_2$ was at least 1400:1.

| Gas Mix | | Permeability | |
|---|---|---|---|
| Pressure NH$_3$ (torr) | Pressure N$_2$ (torr) | PoNH$_3$ (Barrer) | Po/Δl |
| 80 | 720 | 7.0 × 10$^5$ | 1.8 × 10$^7$ |
| 160 | 640 | 4.7 × 10$^5$ | 1.2 × 10$^7$ |
| 320 | 480 | 3.2 × 10$^5$ | 8.4 × 10$^6$ |
| 480 | 320 | 2.8 × 10$^5$ | 7.4 × 10$^6$ |
| 630 | 170 | 2.4 × 10$^5$ | 6.3 × 10$^6$ |
| 800 | 0 | 2.2 × 10$^5$ | 5.7 × 10$^6$ |

EXAMPLE 4

Separation of Carbon Dioxide from Nitrogen using a Tetrahexylammonium Benzoate Immobolized Molten Salt Membrane The membrane was prepared by placing several drops of tetrahexylammonium benzoate (THAB, Eastman Kodak Corp.) on a circular piece of 3501 Celgard ™ (Celanese Corp., thickness 0.0027 cm, area 2.56 cm$^2$, pore dimensions 0.4 × 0.04 micrometers, tortuosity 1.25, porosity 0.5). The salt was smeared over the polymer film and allowed to enter the porous polymer. Excess salt was removed. The membrane was loaded into the lower-temperature cell, thermostatted with an ethylene glycol bath.

The initial feed flow was 11.7 cm$^3$/min of carbon dioxide and 16.9 cm$^3$/min of nitrogen and the permeate flow was 10 cm$^3$/min of helium, both at 1 atm. The permeate was analyzed for carbon dioxide and nitrogen by gas chromatography, using an 183 cm Poropak P column, run isothermally at 60° C.

Carbon dioxide and nitrogen permeabilities were measured as a function of temperature, taking into account the tortuosity and porosity of the support.

Results were:

| Temperature(°C.) | Permeability CO$_2$ (Barrer) | Selectivity (PoCO$_2$/PoN$_2$) |
|---|---|---|
| 40 | 240 | 15.0 |
| 50 | 312 | 13.6 |
| 60 | 404 | 11.9 |
| 70 | 498 | 10.6 |
| 80 | 588 | 9.6 |
| 100 | 821 | 7.8 |
| 120 | 1070 | 6.4 |

These results show that carbon dioxide permeability increases with increasing temperature, but selectivity decreases.

EXAMPLE 5

Separation of Carbon Dioxide from Nitrogen using a Tetrahexylammonium Sarcosinate (THAS) Immobolized Molten Salt Membrane Tetrahexylammonium hydroxide was prepared by stirring together tetrahexylammonium bromide (2.2 g, Eastman Kodak Corp.) and 6.5 g. of silver (I) oxide in 25 ml of 80% methanol:20% water by volume. The hydroxide was titrated with aqueous sarcosine solutin. Removal of solvent, using a rotary evaporator, give tetrahexylammonium sarcosinate, N(n-C$_6$H$_{11}$)$_4$$^+$ NH(CH$_3$)-CH$_2$COO$^-$, in the form of a yellow liquid. The sarcosinate was used to prepare a membrane, supported in a porous polymer film as in Example 4. The membrane was 0.0027 cm in thickness, 2.56 cm$^2$ in area, and had a tortuosity of 1.25 and porosity of 0.5. The permeation experiments were done at gas pressures about 760 torr at feed flows of 11.7 cm$^3$/min for carbon dioxide and 16.9 cm$^3$/min for nitrogen and sweep gas flow (helium) of 10 cm$^3$/min.

Results were:

| Temperature(°C.) | Permeability CO$_2$ (Barrer) | Selectivity (PoCO$_2$/PoN$_2$) |
|---|---|---|
| 40 | 68 | 11.3 |
| 50 | 105 | 11.7 |
| 60 | 155 | 11.9 |
| 70 | 259 | 12.3 |
| 75 | 481 | 12.2 |

The THAS membrane was operated for about four days at or below 75° C. without any observed alteration in its properties. After the membrane was heated to 95° C., the carbon dioxide permeability at 60° C. was 281 Barrers and PoCO$_2$/PoN$_2$ was 12.8.

Although the THAS membrane had lower carbon dioxide permeability than the THAB membrane of Example 4, the THAS membrane had higher selectivity at elevated temperatures than the THAB membrane.

EXAMPLE 6

Separation of Water Vapor from Nitorgen using Lithium Nitrate/Sodium Nitrate Immobolized Molten Salt Membrane A molten salt membrane of a mixture of lithium nitrate/sodium nitrate (0.75:0.25 mol %) was immobilized in a stainless steel wire mesh as in Example 1. The membrane was placed in the high temperature cell and used to separate water vapor from nitrogen. The detection system was similar to that of Example 1, except that a set of hygrometers was attached to each of the feed and permeate streams to measure dew or frost point (water concentration). The nitrogen/water feed mixtures were prepared by passing nitrogen through a bubbler, immersed in a water/ethylene glycol constant temperature bath. Feed mixtures of 1–3% (by volume) of water were thus obtained.

Gas flows were 20 cm$^3$/min at about 1 atm. The membrane thickness (steel mesh) was 0.02 cm and the membrane area 0.8 cm$^2$. When the membrane was heated to 230° C., very low nitrogen permeability was observed. This indicates that the molten salt film was continuous. The membrane was tested over four days with nitrogen/water mixtures. Results were:

| T membrane | Water Pressure(torr) | | Water Permeability |
|---|---|---|---|
| (°C.) | Feed | Permeate | (Barrer) |
| 200 | 15.48 | 0.66 | $4.3 \times 10^4$ |
| 240 | 15.48 | 0.72 | $5.4 \times 10^4$ |
| 300 | 15.48 | 0.75 | $5.6 \times 10^4$ |
| 200 | 11.99 | 2.94 | $3.6 \times 10^5$ |
| 240 | 11.99 | 3.10 | $3.8 \times 10^5$ |
| 300 | 11.99 | 3.47 | $4.5 \times 10^5$ |

Owing to the low level of nitrogen passing the film, of the order of the backgorund level of nitrogen, only a lower limit for hydrogen/nitrogen selectivity could be estimated. The thus-estimated $PoH_2O/PoN_2$ is about 200:1. It is therefore apparent that the sodium/lithium nitrate immobilized salt membrane permits excellent separation of water from nitrogen at 2100°–300° C.

EXAMPLE 7

Effect of Water on Separation of Carbon Dioxide Using an Immobilized Salt Membrane of Tetrahexylammonium Benzoate A membrane of tetrahexylammonium benzoate, under conditions otherwise as in Example 4, was used to study the effect of added water on the efficiency of separating carbon dioxide from nitrogen. The wet feed was produced by bubbling feed through water at ambient temperature before passage over the membrane. The following results were obtained:

| Temp. (°C.) | Feed | Permeability $CO_2$ (Barrer) | Selectivity ($P_{CO_2}/P_{N_2}$) |
|---|---|---|---|
| 40 | dry | 194 | 14.2 |
| 40 | wet | 228 | 15.1 |
| 50 | dry | 252 | 12.6 |
| 50 | wet | 279 | 13.1 |
| 60 | dry | 311 | 11.1 |
| 60 | wet | 339 | 11.7 |
| 70 | dry | 388 | 10.0 |
| 70 | wet | 407 | 10.4 |
| 80 | dry | 468 | 9.0 |
| 80 | wet | 480 | 9.2 |
| 90 | dry | 550 | 8.2 |
| 90 | wet | 546 | 8.5 |
| 100 | dry | 696 | 7.3 |
| 100 | wet | 700 | 7.4 |

These results show that moist feed had higher carbon dioxide permeability and selectivity at lower temperatures than dry feed. As the temperature was raised, the effect of added water decreased. In experiments at 90° C. and above, addition of water to the feed had no measurable effect.

EXAMPLE 8

Immobilized Triethylammonium Chlorocuprate, $Et_3NH^+[CuCl_2^-]$ and $Et_3NH^+[Cu_2Cl_3]$ Melt Membranes for the Separation of CO from $N_2$:

The above salts were prepared by the direct combination of 1:1 and 1:2 mixtures of $Et_3NHCl$ and $CuCl$, respectively, as described by D. D. Axtell, D. W. Good, W. W. Porterfield, J. T. Yoke, J. Am. Chem. Soc. 95 14 (1973), and references cited therein. An immobilized melt membrane was prepared by applying the liquid $Et_3NH^+[CuCl_2^-]$ salt to a ca. 27 μm-thick Celgard ®3501 film. The membrane was loaded into a standard membrane test cell and tested for the separation of CO from $N_2$. These experiments were done using a single feed pressure of $CO/N_2$ and with the permeate stream swept by a stream of helium. The results were as follows:

| | Feed Gas Flow: 20 SCCM | | Permeate Gas He Flow: 10 SCCM; 76 cmHg | | |
|---|---|---|---|---|---|
| Temp. (°C.) | $P_{CO}$ (cmHg) | $P_{N_2}$ (cmHg) | $P_o(CO)$ (Barrers) | $P_o(N_2)$ (Barrers) | α $CO/N_2$ |
| 20 | 46 | 30 | 63 | ≈1.6 | 40 |
| 21 | 46 | 30 | 67 | ≈1.6 | 40 |
| 30 | 46 | 30 | 80 | ≈2.5 | 30 |

A membrane was prepared as above by imbibing $Et3NH^+[Cu_2Cl_3^-]$ in Celgard ®. The membrane was tested for the separation of CO from $N_2$ as above. The results were as follows:

| | Feed Gas Flow: 20 SCCM | | Permeate Gas He Flow: 10 SCCM; 76 cmHg | | |
|---|---|---|---|---|---|
| Temp. (°C.) | $P_{CO}$ (cmHg) | $P_{N_2}$ (cmHg) | $P_o(CO)$ (Barrers) | $P_o(N_2)$ (Barrers) | α $CO/N_2$ |
| 20 | 46 | 30 | 33 | ≈0.5 | 60 |
| 30 | 46 | 30 | 56 | ≈0.6 | 90 |
| 40 | 46 | 30 | 66 | ≈0.7 | 90 |
| 50 | 46 | 30 | 73 | 1 | 70 |

It is evident that good separation of CO and $N_2$ can be achieved; one that cannot be realized using membranes made of conventional polymer materials which as a rule, have similar permeabilities for CO and $N_2$. This is illustrated as a comparative example with data obtained by running the separation experiment using polydimethylsiloxane and polysulfone. The results of this comparison are as follows:

| Polymer | $P_o(CO)$ (Barrers) | $P_o(N_2)$ (Barrers) | α $CO/N_2$ |
|---|---|---|---|
| Polydimethylsiloxane | 340 | 280 | 1.2 |
| Polysulfone | 0.21 | 0.10 | 1.9 |

In the above Examples, the membranes utilized were formed by either immobilizing a molten salt within the porous structure of an inert supporting material the dense phase of which has inherently low gas permeability, or by the above in comination with forming a molten salt layer on the surface of the porous support. The "bubble point" or the "burst pressure"; i.e., the pressure needed to overcome capillary forces and extrude the liquid from the pore, is dependent on the radius of the pore and the nature of the fluid. Materials with very small pores are able to retain liquid at quite high pressures. Nonetheless, there are a number of applications which may require operation under extremely large pressure gradients, i.e., in ammonia synthesis plants, the upgrading of natural gas, landfill gas processing, and steam reformers. To overcome the possibility of "losing" the molten salt medium due to these extremely high pressures, encapsulated molten salt (EMS) membranes were also synthesized. In its simplest form, an EMS membrane consists of a thin film of a gas permselective molten salt encased within a non-porous, but relatively gas permeable, though not necessarily permselective, polymer or polymer blend material. Techniques for "packaging" liquid membranes in general are well known in the art, and are taught in such references as N. C. Otto and J. Quinn, "The Facilitated Transport of Carbon Dioxide Through Bicarbonate Solutions," *Chemical Engineering Science*, 1971, Vol. 26, pp. 949-961. A second type of encapsulated molten salt membrane can be prepared by encasing an immobilized salt membrane, as described in the above Examples, and depicted in FIG. 1, within a highly gas permeable material (#13 in FIG. 1). Typical examples of this type of membrane include membranes which consists of a molten salt imbibed Celgard ® 3501 porous polypropylene film encased by layers of silicone rubber, poly(trimethylsilylpropyne), or 4-methyl-1- pentene. A preferred embodiment of this type of membrane synthesis is to have the non-porous coating partially intrude into the pore of the porous material containing the molten salt in order to produce ultra-thin films of the permselective immobilized molten salt.

Whereas the achievable thickness of immobilized molten salt membranes is dictated by the availability of porous-thin sheets or hollow fiber materials that are used to support the salt, the encapsulation technique described above, wherein an unsupported melt is held within a polymer envelope of the non-porous, permeable polymer material, it is possible to fabricate membranes which contain a very thin active melt layer without being limited by the availability of porous support film materials. Additionally, encapsulated molten salt membranes are less susceptible to salt loss by extrusion when exposed to high pressure membrane differentials than are the non-encapsulated immobilized molten salt systems. The encapsulated membranes are also less susceptible to fouling by dust, solvent or aqueous sprays or any other extraneuous conditions which could lead to the loss or contamination of the molten salt in an immobilized salt membrane. Molten salt membranes that are encapsulated by various non-porous polymers can actually be used in direct contact with aqueous solutions either at the feed side, a permevaporation membranes or at both feed and permeate sides.

The following examples illustrated several gas separation techniques employing encapsulated molten salt membranes. These examples are meant only to illustrate the invention, and are not meant to limit the invention.

EXAMPLE 9

TETRAHEXYL AMMONIUM BENZOATE (THAB) ENCAPSULATED MOLTEN SALT MEMBRANE FOR THE SEPARATION OF $CO_2$ FROM $CH_4$ AT 30° C.

An encapsulated molten salt or film of the membrane was prepared by encasing a film of the THAB melt between two pieces of poly(trimethylsilylpropyne) (PTMSP). The PTMSP was chosen because of its excellent gaspermeation properties. The specific procedure and the properties of the resulting membrane are as follows.

A 2% solution of PTMSP in toluene was evaporated to dryness to produce a thin circular film (ca 50 $\mu$m thick). Next, THAB was spread evenly onto this film to give a continuous layer of the molten salt. (A narrow section of uncovered film was left around the perimeter.) This assembly was then covered with a precast film of PTMSP and the resulting composite sealed around the edges by brushing with toluene. The encapsulated membrane was sealed in a standard test cell and tested for the separation of $CO_2$ from $CH_4$ at 30° C. Experimental conditions and results are detailed below. In this case, because the thickness of the active layer (nominally 100$\mu$) is not known precisely, performance is reported in permeance units. The observed permeance of $CO_2$ and of $CH_4$ are determined largely by the molten salt layer. It is estimated that the $CO_2$ permeance of the PTMSP encapsulation material in the actual composite membrane is of the order of $10^{-4}$ scc/$cm^2$scmHg, vis-a-vis a $CO_2$ permeance of $\approx 10^{-6}$ scc/$cm^2 \cdot s \cdot cmHg$ for the molten salt inner element.

The results of the above example are as follows:

| FEED GAS FLOW: 20 SCCM | | PERMEATE GAS He Flow: 10 SCCM; P = 76 cmHg PERMEANCE ($\phi$)(scc/$cm^2 \cdot s \cdot cmHg$) | | |
|---|---|---|---|---|
| $P_{CO_2}$ (cmHg) | $P_{CH_4}$ (cmHg) | $\phi$ ($CO_2$) | $\phi$ ($CH_4$) | $\alpha$ $CO_2$/$CH_4$ |
| 41 | 41 | 0.70 × $10^{-6}$** | 1.61 × $10^{-7}$** | 4.3 |
| 80 | 80 | 1.45 × $10^{-6}$ | 3.06 × $10^{-7}$ | 4.7 |
| 117 | 117 | 1.7 × $10^{-6}$ | 3.74 × $10^{-7}$ | 4.5 |
| 187 | 187 | 1.9 × $10^{-6}$ | 4.13 × $10^{-7}$ | 4.6 |

Membrane area = 2.56 $cm^2$
**Measured with the membrane at 25° C.

EXAMPLE 10

PTMSP ENCAPSULATED $N(C_2H_5)_3H^+[CuCl_2^-]$ MOLTEN SALT FOR THE SEPARATION OF CO FROM $H_2$ and $N_2$ The room temperature molten salt $N(C_2H_5)_3H^+[CuCl_2^-]$ was made as described by direct combination of equimolar amounts of $N(C_2H_5)_3H^+$ and CuCl. The product was a viscous yellow-green oil which was shown to reversibly bind CO by virtue of its IR spectrum; when exposed to gaseous CO (5 min. at 1 atm.), a band appeared at 2085 $cm^{-1}$ which is attributed to a copper carbonyl species. This band disappeared after purging with $N_2$ (10 min., 1 atm.).

A circular piece of Celgard ® 3501 film (3 cm dia., ca. 27 $\mu$m in thickness) was impregnated with the above copper containing molten salt and then encapsulated by PTMSP. A 2% solution of PTMSP in toluene was evaporated to dryness to produce a film of 5 cm dia. and ca. $\approx$50 $\mu$m thick PtMSP. The resulting composite membrane wherein the $N(C_2H_5)_3H^+[CuCl_2^-]$/Celgard is sealed (encapsulated) within an envelope of PTMSP was tested for the separation of CO from $N_2$ and $H_2$ under a variety of conditions.

For the operation of the membrane at transmembrane pressure differentials of up to 388 cmHg, it is evident that the membrane effects a good separation between CO and $N_2$ at 26°-50° C. under a wide range of feed pressures. High CO fluxes can be achieved while the selectivity $\alpha CO/N_2$ ranges from about 22 to 36. The permeability of CO shows changes with increasing pressure which is indicative of a facilitated transport or carrier-mediated mechanism for the permeation of CO.

For measurements conducted up to a H2 partial pressure of 79 cmHg, no H2 was observed in the permeate. Based on the sensitivity of the systems towards H2, the minimum selectivity, $\alpha$ CO/H2, is estimated to be at least 15.

After oxidation of the salt [i.e., Cu(I)→Cu(II)], the permeability of CO was approximately 3 Barrers. This is also an indication of the occurrence of a facilitated transport mechanism in the original unoxidized salt, however, some of the reduction of CO permeability could have arisen from changes in the physical characteristics of the media as a result of the oxidation. The level of N2 in the permeate was very low and could not be integrated reproducibly.

The results of this Example are as follows:

| Feed Gas Flow: 20 SCCM | | | Permeate Gas He Flow: 10 SCCM; 76 cmHg | | | |
|---|---|---|---|---|---|---|
| $P_{CO}$ (cmHg) | $P_{H2}$ (cmHg) | $P_{N2}$ (cmHg) | $P_o$ (CO) (Barrers) | $P_o$ (N2) (Barrers) | $\alpha$ CO/N2 | $\alpha$ CO/H2 |
| TEMPERATURE = 26° C. | | | | | | |
| 23 | 23 | 46 | 59 | ≈2.7 | 22 | |
| 39 | 39 | 78 | 53 | ≈2.1 | 25 | |
| 58 | 58 | 117 | 44 | ≈2.3 | 20 | |
| 79 | 79 | 158 | 41 | ≈1.8 | 23 | >15 |
| 97 | 97 | 194 | 41 | ≈1.8 | 23 | |
| TEMPERATURE = 50° C. | | | | | | |
| 19 | 19 | 38 | 130 | ≈5.8 | 22 | |
| 39 | 39 | 78 | 100 | ≈2.9 | 35 | |
| 58 | 58 | 117 | 94 | ≈3.1 | 30 | |
| 79 | 79 | 158 | 89 | ≈3.4 | 26 | |
| 97 | 97 | 194 | 130 | ≈3.6 | 36 | >15 |

EXAMPLE 10

SILICONE RUBBER ENCAPSULATED NEt3H+[CuCl2−] IMMOBILIZED MOLTEN SALT MEMBRANE FOR THE SEPARATION OF CO FROM H2 AND N2

A composite membrane was prepared by first immobilizing $N(C_2H_5)_3H^+[CuCl_2^-]$ into the pores of Celgard 3501 ®. This "active element" was then backed on both sides by a sheet of silicone rubber. The edges were not sealed as was done in Example 9. In this case, the compression of the membrane in the test cell served to seal the edges. The membrane was used in the test cell with the "active element", being slightly larger than the section of the test cell that is exposed to the feed and permeate gases.

In this test, the partial pressures of the feed gases were 19, 19 and 38 cmHg for CO, H2 and N2, respectively. The sweep rate (He) and feed rate were each 10 sccm. At 26° C., the permeability of CO was 35.6 Barrers (assuming $1=27$ μm). Under these conditions no H2 or N2 was observed in the permeate stream. We estimate $\alpha$ CO/N2 was at least 30:1 and $\alpha$CO/H2 was at least 7:1.

Having thus described the present invention, what is now deemed appropriate for Letters Patent is set out in the following appended claims.

What is claimed is:

1. A process for separating at least component from at least one another component in a gaseous mixture in a non-electrolyte system, said process comprising passing the gaseous mixture over a membrane containing an active, non-alkali or alkaline earth oxide or carbonate, molten salt, wherein said membrane selectively permeates at least one component of the gaseous mixture due to one or more reversible reactions between the component being separated and the active, non-alkali or alkaline earth oxide or carbonate, molten salt.

2. A process in accordance with claim 1 wherein said molten salt is capable of undergoing one or more reversible reactions, other than oxidation reduction reactions, with the gas being separated.

3. A process in accordance with claim 2, wherein the reversible reaction is an acid-base reaction, the gas being separated from the gas mixture is carbon dioxide, the active material in the membrane is a molten tetraalkylammonium benzoate in the presence of water vapor, and alkyl is of 1-20 carbon atoms.

4. A process in accordance with claim 2, wherein the reversible reaction is formation of a coordination complex, the gas being separated from the mixture is water and the active material in the membrane is a molten mixture of lithium nitrate and sodium nitrate in 5:95 to 95:5 ratio by weight.

5. A process in accordance with claim 1 wherein the active molten salt is immobilized within the pores of a thin, porous, inert support.

6. A process in accordance with claim 1 wherein the active molten salt is encapsulated in a non-porous, gas permeable, polymer or polymer blend material.

7. A process in accordance with claim 6 wherein the nonporous, gas permeable polymer material is 4-methyl-1-pentene, poly(trimethylsilylpropyne) or silicone rubber.

8. A process in accordance with claim 1 wherein the reversible reaction is an acid-base reaction; the formation of a coordination complex or the formation of an organic compound.

9. A process in accordance with claim 1, wherein the reversbile reaction is formation of a coordination complex, ammonia is the gas being separated and the active material in the membrane is molten lithium nitrate.

10. A process in accordance with claim 1, wherein the reversible reaction is formation of a coordination complex, the gas being separated from the gas mixture is ammonia and the active material in the membrane is molten zinc chloride.

11. A process in accordance with claim 1 wherein said molten salt is supported on a macro-porous support composed of ceramic, metallic or polymeric material.

12. A process in accordance with claim 1 wherein the gaseous mixture is a wet gas containing carbon dioxide.

13. A process in accordance with claim 1, wherein the reversible reaction is formation of an organic chemical compound, the gas being separated from the mixture is carbon dioxide, the active material in the membrane is a molten tetraalkylammonium sarcosinate or glycinate and alkyl is of 1-10 carbon atoms.

14. A process in accordance with claim 1 wherein the active molten salt comprises trimethylammonium chlorocuprate, and CO is the gas being separated from a gas mixture comprising H2, CO and N2.

15. A process for separating a gaseous component from at least one or more gaseous components in a gaseous mixture in a non-electrolyte system, said process comprising introducing the gaseous mixture into a module having at least a feed gas inlet and a permeate gas outlet and containing a membrane selectively permeable to the gas being separated, which membrane comprises an active, non-alkali or alkaline earth oxide or carbonate molten salt in or on a support material, said molten salt being capable of undergoing one or more reversbile reactions with the gas being separated, passing the gaseous mixture through the feed inlet and into contact with the inlet side of the membrane; removing from the inlet side of the membrane a gas stream rejected by the membrane; and removing from the permeate gas outlet the gas reactively passing through the membrane.

16. A process in accordance with claim 15 wherein the gas passing reactively through the membrane is removed by a stream of sweep gas or by using a compressor.

17. A process in accordance with claim 15 wherein the module comprises a membrane contained within a configuration of hollow fibers, spirally wound sheets or a series of flat plates.

18. A process in accordance with claim 15 wherein the molten salt is capable of undergoing one or more reversible reactions, other than oxidationreduction reactions, with the gas being separated.

19. A process in accordance with claim 18 wherein the molten salt is immobilized within the pores of a thin, porous, inert support.

20. A process in accordance with claim 15 wherein the molten salt is encapsulated in a non-porous, gas permeable, polymer or polymer blend material.

* * * * *